United States Patent [19]

Hillstead et al.

[11] 4,198,032

[45] Apr. 15, 1980

[54] BOTTOM OPERABLE TANK CAR LADING VALVE ASSEMBLY WHICH DOES NOT REQUIRE A SKID

[75] Inventors: David P. Hillstead; Robert W. Randolph; Gunter R. Behle, all of St. Charles, Mo.

[73] Assignee: ACF Industries, Incorporated, New York, N.Y.

[21] Appl. No.: 879,352

[22] Filed: Feb. 21, 1978

[51] Int. Cl.$^2$ .......................... F16K 27/03; F16K 1/48
[52] U.S. Cl. .................................. 251/144; 251/268
[58] Field of Search ............... 251/144, 266, 267, 268, 251/269; 137/347, 350, 797

[56] References Cited

U.S. PATENT DOCUMENTS

| | | | |
|---|---|---|---|
| 1,135,254 | 4/1915 | Bloxham | 251/144 |
| 3,981,481 | 9/1976 | Reedy et al. | 251/144 |
| 4,106,749 | 8/1978 | Behle | 251/144 |
| 4,121,614 | 10/1978 | Reedy | 251/144 |
| 4,124,193 | 11/1978 | Reedy et al. | 251/144 |
| 4,141,535 | 2/1979 | Reedy et al. | 251/144 |

*Primary Examiner*—William R. Cline
*Attorney, Agent, or Firm*—Henry W. Cummings

[57] ABSTRACT

In accordance with the present invention a tank car mounting flange is welded to an opening in the tank bottom and preferably does not extend below the bottom surface of the tank more than one (1) inch to comply with AAR and DOT Regulations. A valve body including a valve seat is located concentrically within the mounting flange and is removably attached to the mounting flange. The valve body may be attached to the mounting flange with a threaded fitting, or with fasteners and a retaining ring located within the mounting flange, in which fasteners holding the retaining ring in place extend into the mounting flange. A depending housing including a lower operator is attached to the mounting flange or to the retaining ring with fasteners which define a shear plane. In order that there be sufficient material in the mounting flange to be structurally sound while including openings for the fasteners in the mounting flange, and not extend more than one (1) inch below the tank bottom, the mounting flange may include fastener portions extending into the tank above the area where the fastener openings are drilled. Further, the mounting flange fastener portion may be provided with slots or channels to facilitate lading flow into the outlet during unloading. In one embodiment the portions extending into the tank comprise mounds or knobs extending into the tank, separated by open areas for lading flow.

10 Claims, 7 Drawing Figures

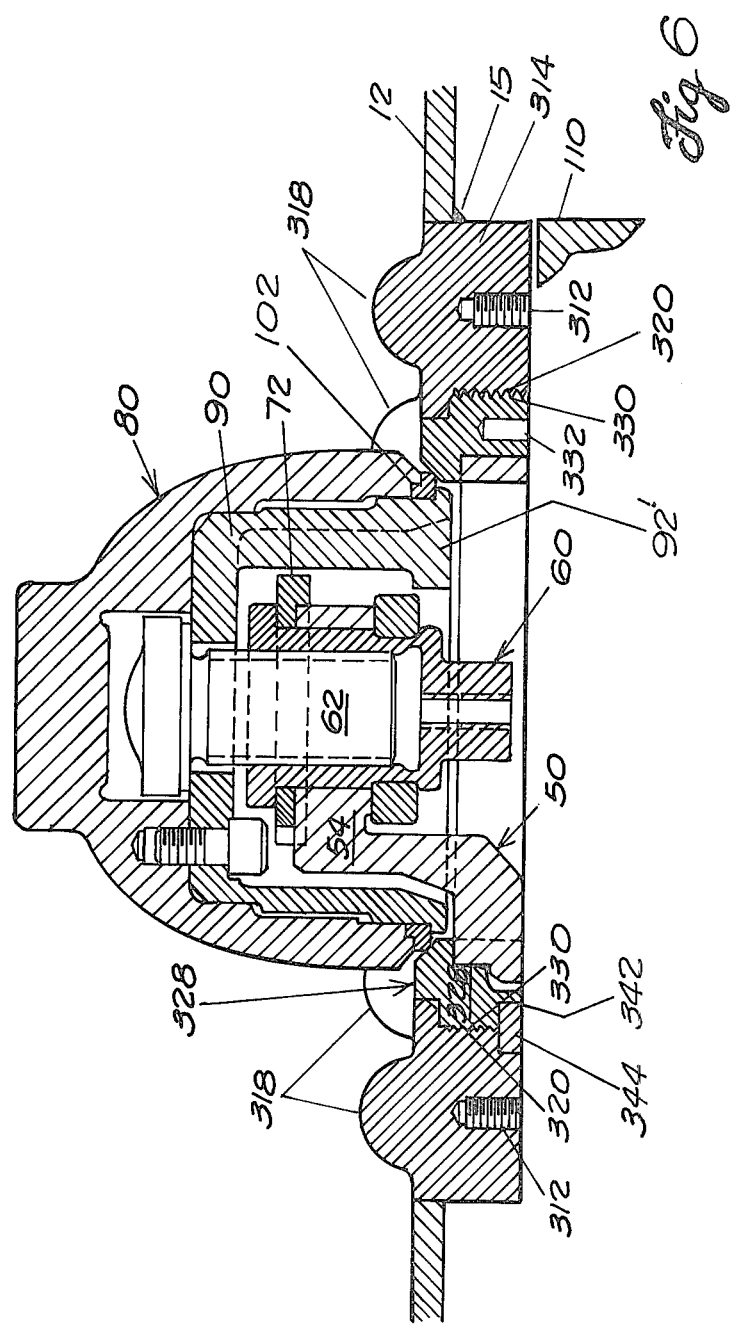

BOTTOM OPERABLE TANK CAR LADING VALVE ASSEMBLY WHICH DOES NOT REQUIRE A SKID

BACKGROUND OF THE INVENTION

U.S. Pat. Nos. 3,981,481 granted Sept. 21, 1976, 4,124,193 granted Nov. 7, 1978 and 4,141,535 granted Feb. 27, 1979, disclose bottom operable tank car valve assemblies including a valve body welded to the tank car bottom mounting flange. A depending housing is attached to the valve body with fasteners defining a shear plane. The housing contains a lower operator which extends vertically upwardly and engages an upper operator which in turn engages a valve closure located in the valve body. Upon hard impact the housing and lower operator will shear and/or drop off, leaving in place the valve closure and upper operator. In U.S. Pat. No. 4,158,453 granted June 19, 1979 the valve body is welded to a universal tank car mounting flange which is welded to the tank bottom. In addition, the closure includes a depending keeper member having inwardly directed catches or stops which engage a portion of the upper operator when the closure reaches the full open position.

Association of American Railroads (AAR) and Department of Transportation (DOT) Regulations require that projections from tank car bottoms extending downwardly more than one (1) inch must either readily break off upon impact or be protected with skids. According to the regulations, the skids must extend three inches longitudinally of the car for each unit of downward vertical extension. This adds cost and weight to the car.

In the construction shown and described in U.S. Pat. No. 4,158,453 and in Ser. No. 860,987 filed Dec. 15, 1977 the valve body includes a flange portion extending below the universal mounting flange. This universal mounting flange and the valve body flange portion extend more than one (1) inch below the tank bottom and a skid, as described above, is thus required.

SUMMARY OF THE INVENTION

An object of the present invention is to provide a bottom operable valve assembly including a valve body which can be attached to a tank car mounting flange, and in which neither the valve body nor the mounting flange need extend below the tank bottom sufficiently far as to require a skid to comply with AAR and DOT Regulations.

Another object of the invention is to provide a bottom operable tank car valve assembly wherein the valve body includes a valve seat for the valve closure and wherein the valve body is readily removable for repair or replacement, for example, if the valve seat is damaged.

It is another object of the invention to provide a bottom operable tank car valve assembly in accordance with the foregoing objects in which all of the operating parts of the valve assembly accept the valve closure, the valve seat and the mounting flange can be removed for repair or replacement with lading in the tank, with the valve closure remaining in closed, seated position on the valve seat, preventing lading from escaping from the tank.

In accordance with the present invention a tank car mounting flange is welded to an opening in the tank bottom and preferably does not extend below the bottom surface of the tank more than one (1) inch to comply with AAR and DOT Regulations. A valve body including a valve seat is located within the mounting flange and is attached to an opening in the mounting flange. The valve body may be removably attached to the mounting flange with a threaded fitting, or with fasteners and a retaining ring located within the mounting flange, in which fasteners holding the retaining ring in place extend into the mounting flange. A depending housing including a lower operator is attached to the mounting flange or to the retainer with fasteners which define a shear plane.

In order that there be sufficient material in the mounting flange to be structurally sound while including openings for the fasteners extending into the mounting flange and not extend more than one (1) inch below the tank bottom, the mounting flange may include a fastener portion which extends above the tank bottom into the tank. Further, the mounting flange fastener portion is preferably provided with slots or channels to facilitate lading flow into the outlet during unloading. Alternatively the mounting flange fastener portion may be provided as mounds or knobs extending into the tank above the area where the fastener openings are drilled. The latter is readily formed as a casting.

A vertically movable valve closure includes a depending seal retainer which holds in place a periferal seal which engages the valve seat in closed position to maintain lading in the tank. An operator retainer engages the inner surface of the valve body and includes a plurality of radially extending ribs. The operator retainer ribs engage an upper valve operator and maintain the upper operator spaced from the walls of the valve body and vertically fixed, but rotatable. The depending seal retainer includes radially extending arm portions. When the stem is rotated by the upper operator, the radial arm portions engage the operator retainer ribs to prevent further rotation of the valve closure. Further rotation of the upper operator causes vertical movement of the valve closure between open and closed positions. The seal retainer includes inwardly directed stops or catches which engage a stop on the upper operator when the valve closure reaches the full open position.

The lower operator includes a tool connection portion in the lower part of the depending housing and a vertical extension which engages the upper operator to rotate the same to move the valve closure between closed and open positions. The valve housing, the lower operator, the upper operator and the upper operator retainer may be removed with lading in the tank for repair or replacement, leaving in place the valve closure, the seal retainer, the valve body and the mounting flange to maintain the lading in the tank during repair or replacement.

THE DRAWINGS

FIG. 3A is a detailed vertical sectional view illustrating a key connecting the valve body with the mounting flange to prevent rotation of the valve body;

FIG. 6 is an alternative embodiment similar to FIG. 6 illustrating a threaded connection between the mounting flange and the valve body, and a modified keeper.

DESCRIPTION OF PREFERRED EMBODIMENTS

Figure 1:
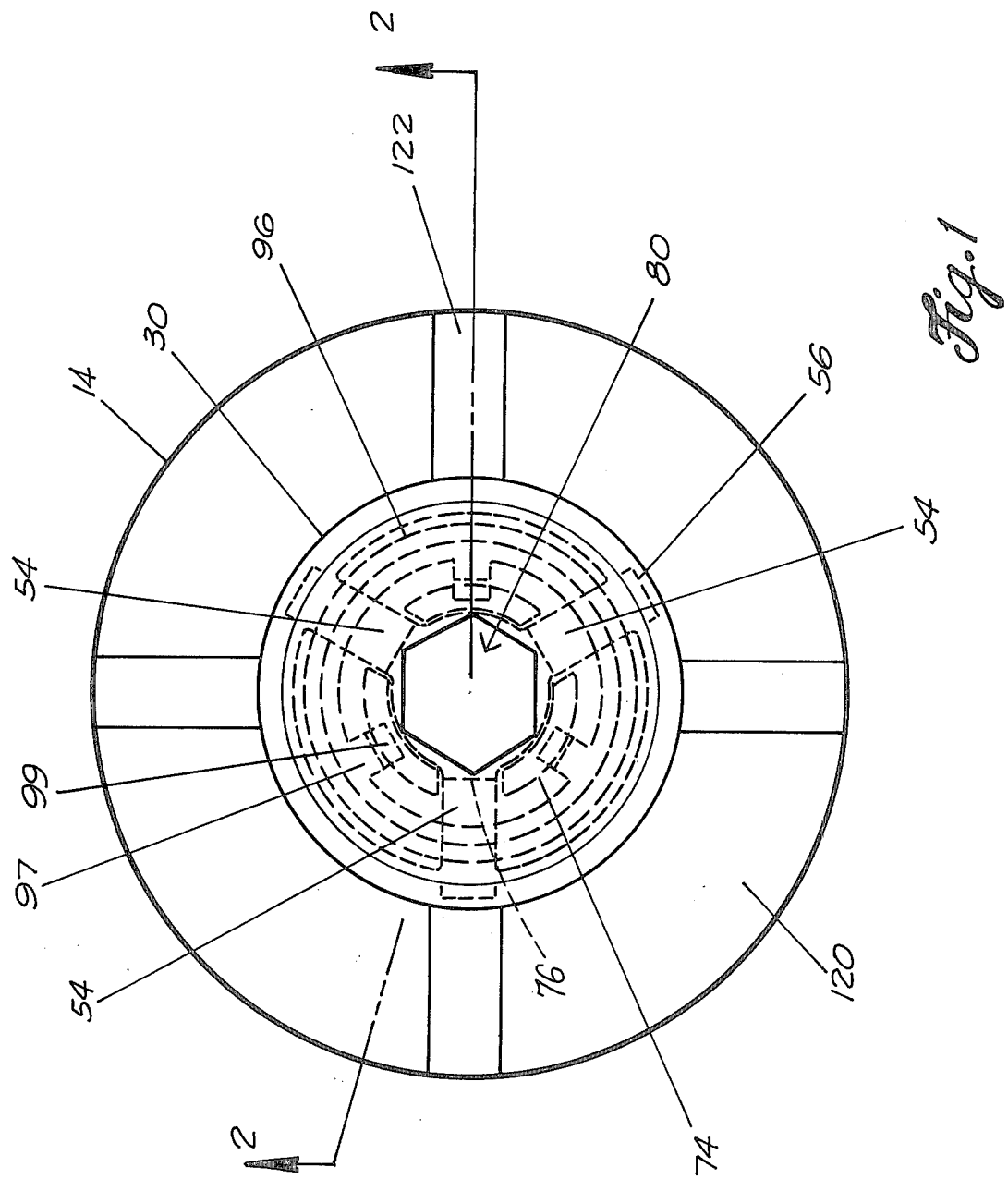
FIG. 1 is a plan view of one embodiment of the present invention.

A railway tank car is indicated in the drawings generally at 10. This tank car includes a tank bottom 12. A mounting flange 14 is welded to the tank bottom at 15. The mounting flange 14 includes a lower machined surface 16 defining a slot 18. A retaining ring 20 is located within the slot 18. Countersunk openings 22 in the retaining ring and drilled openings 23 in the mounting flange are provided to receive fasteners 24 to hold the retaining ring in place. A depending housing 110 to be described hereinafter is held in engagement with retainer plate or ring 20 by means of fasteners 111 extending through flange portion 112 and openings 114 provided in retainer plate 20.

The inner portion 26 of the retainer plate 20 supports a valve body 28. Valve body 28 includes an upper portion 30 which urges an o-ring seal 32 into engagement with a shoulder portion 17 of machined surface 16 of universal flange 14. Valve body portion 30 further includes a machined valve seat 34 tapered downwardly and inwardly.

In order to prevent valve body 28 from rotating a key slot 40 is provided in mounting flange 14. A cooperating key slot 42 is provided in the valve body. A key 44 (FIG. 3) is inserted into slots 40 and 42 to prevent rotation of the valve body 28.

Valve body 28 further includes a plurality of lower slots 46 and a machined surface 48 to receive an operator retainer indicated in the drawings generally at 50. Operator retainer 50 includes a lower cylindrical portion 52 which engages surface 48 and a plurality of rib members 54 having outwardly directed projections 56 which engage slots 46. Ribs 54 extend inwardly and upwardly and terminate in an upper cylindrical portion 58. Cylindrical portion 58 engages an upper operator indicated generally at 60. Upper operator 60 includes a stem 62 which is internally threaded at 64 and includes a lower connection portion 66 having a drain hole 68, and an upper stem shoulder 70. Retainer cylindrical portion 58 and stem shoulder 70 hold in place an operator stop 72. Stop 72 includes a plurality of stop portions 74 separated by slots 76 (FIG. 1). Retainer cylindrical portion 58 is maintained in place on operator stem 62 further by a split collar 79 of conventional construction.

A closure member 80 includes a lower cylindrical portion 82, an upper opening 84, and a machined surface 86. Fasteners 88 hold in place a keeper or seal retainer 90 including an upper flat portion 92 and a depending cylindrical seal retainer portion 96. Upper keeper portion 92 maintains in place a depending operator or stem 104 which is externally threaded at 106 and includes a head portion 108 supported by keeper portion 92 within opening 84. Seal retainer portion 96 includes outwardly directed projections 98 which hold in place a secondary or lower keeper 100 and an elastomeric seal 102. Elastomeric seal 102 in closed position engages valve seat 34. Seal retainer portion 96 includes circumferentially spaced radially extending arm portions 97 adapted to engage operator retainer ribs 54. Arm portions 97 further include projections or catches 99 engage stop portion 74.

The arm portions 97 further include threaded openings 99a to allow removal of the operator retainer 50, operating assembly 60, and keeper 90 with lading in the tank, leaving closure 80 in place on valve seat 34, as described in greater detail in U.S. Pat. No. 4,161,958 issued July 24, 1979 hereby incorporated into the present application by this reference.

As described in greater detail in U.S. Pat. Nos. 3,981,481; 4,124,193 and 4,141,535 hereby incorporated into the present application by this reference, fasteners 111 constitute a shear plane. Depending housing 110 includes a spout 113 having threads 113a to receive a cap 115 or unloading conduit (not shown). Housing 110 further includes a lower operator 116 having an operating shaft 117, including a lower connection portion 117a, a seal assembly 117b and a cap 117c. Operator 116 further includes an upward extension 118 having a connection portion 119 which in engaged position engages connection portion 66 of upper operator 60. In the event of hard impact to the housing 110, the fasteners 111 will shear off, and the lower housing 110 and lower operator 118 drop from connection portion 66, leaving the valve closure 80 and seal member 102 in closed position, engaging valve seat 34 to substantially prevent escape of lading as a result of such an impact.

Figure 4:
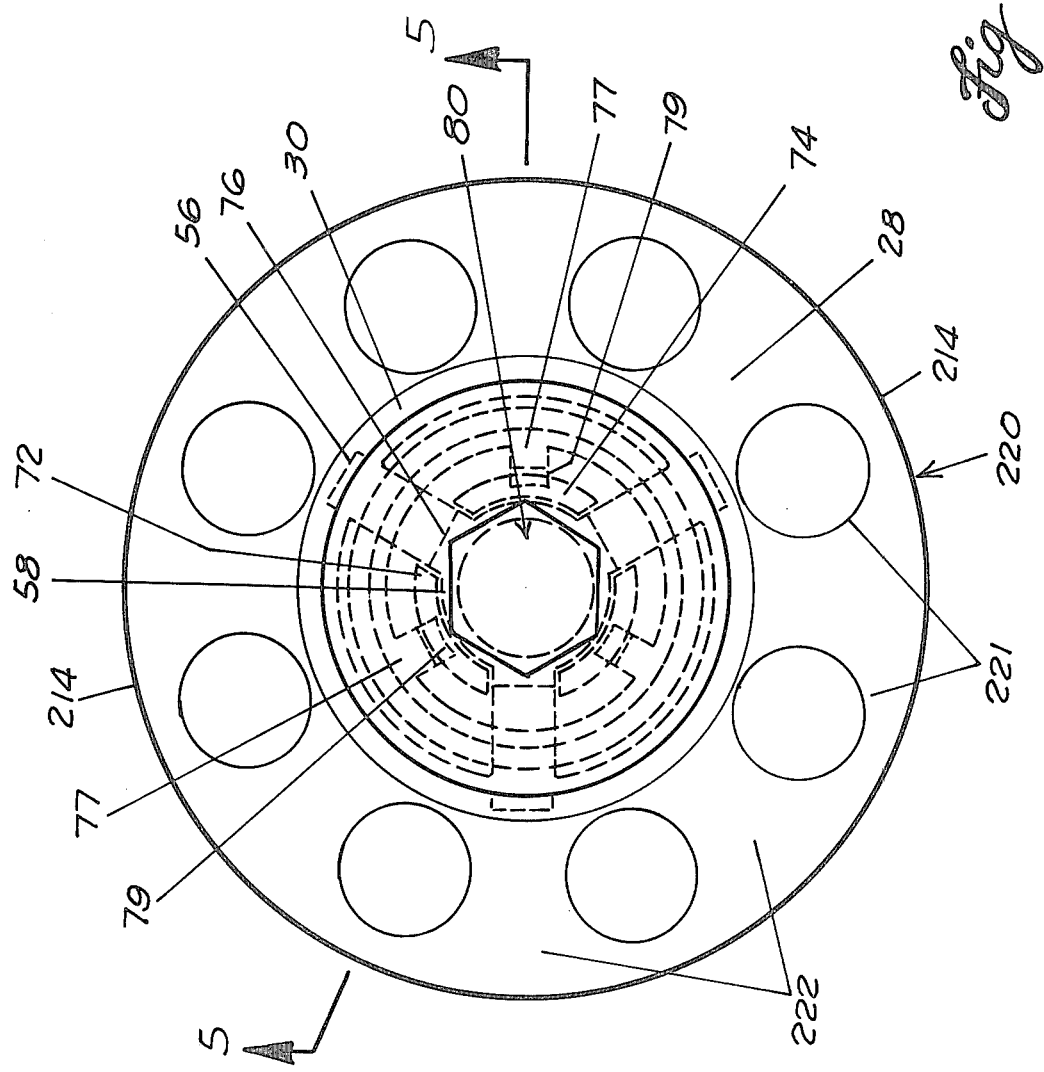
FIG. 4 is a plan view of another embodiment of the present invention.

Mounting flange 14 includes fastener portion 120 which extends above the inner surface of the tank bottom 12 and which provides sufficient material thickness whereby fastener openings 23 do not unduly weaken the mounting flange structurally. To provide effective cleanout, slots 122 are provided as shown in FIGS. 1 and 4. Slots 122 insure that even when viscous ladings are transported, the lading can readily flow into the outlet and be unloaded without undue delay. While four (4) slots are illustrated, the number of slots may vary as desired. In determining the number and shape of the slots, consideration may be given to the particular lading or ladings to be transported most in the car.

Since the mounting flange 14 extends within the tank bottom 12 or is flush therewith (in recessed portion 122), the extent to which the mounting flange extends below the lower external surface 13 of the tank can be reduced. For example, if the tank bottom is 7/16 inch thick, the mounting flange need only extend about one (1) inch below external lower surface 13. This complies with the AAR and DOT Regulations regarding downward projection of outlets. At the same time the mounting flange is structurally sound, and can support the lading and depending housing 110.

Furthermore valve body 28 is located concentrically within mounting flange 14. In accordance with one feature of the present invention, the valve body no longer requires an outwardly extending flange portion located below the mounting flange which according to previous constructions (for example in Ser. No. 834,655, filed Sept. 19, 1977) included a total vertical projection of mounting flange and valve body flange extending below the tank bottom 13 in excess of one (1) inch. By locating the valve body within (rather than below) the mounting flange, it is possible to have a construction which complies with the one (1) inch requirement of the AAR and DOT Regulations, and thus avoids the requirement in the regulations for a skid. A combination skid and valve seat is disclosed and claimed in Ser. No. 860,987 filed Dec. 15, 1977.

Such skids require three longitudinal units for each one unit of downward projection. Thus such skids significantly increase the cost and weight of the car.

The operation of this bottom operable valve assembly is similar to that disclosed in the said U.S. Pat. No. 398,481 patent and in the U.S. Pat. Nos. 4,124,193; 4,141,535; and 4,158,453. Briefly, to open closure 80 to unload the lading, cap 115 is removed and an appropriate tool is attached to the lower connection portion 117a of shaft 117 to cause the same to rotate and in turn rotate connection portions 120 and 66 and stem 62. This in turn causes initial rotation of closure 80 until keeper arms 97 engage ribs 54, during which time seal 102 wipes valve seat 34. After engagement of keeper arms 97 with ribs 94, the closure no longer rotates. Rather it moves vertically to the open position wherein projections or catches 99 engage retainer stop portion 74. Rotation of operator 118 in the opposite direction causes lowering of the valve closure 80 to the seated position shown in solid lines in FIGS. 2 and 3 with seal 102 in engagement with valve seat 102.

Figure 2:
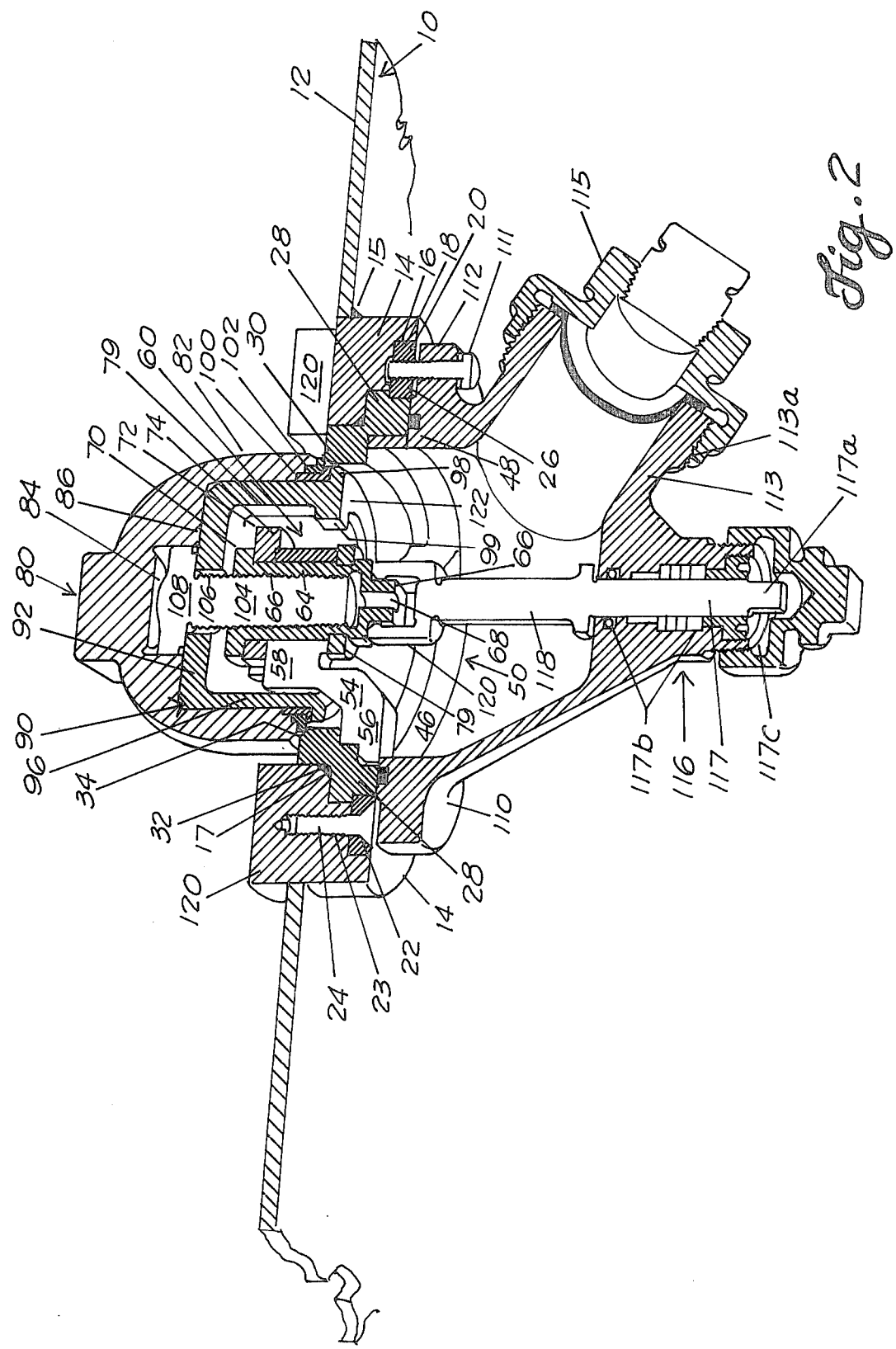
FIG. 2 is a vertical sectional view of the embodiment of the invention shown in FIG. 1 looking in the direction of the arrows along the line 2—2 in FIG. 1.
Figure 3:
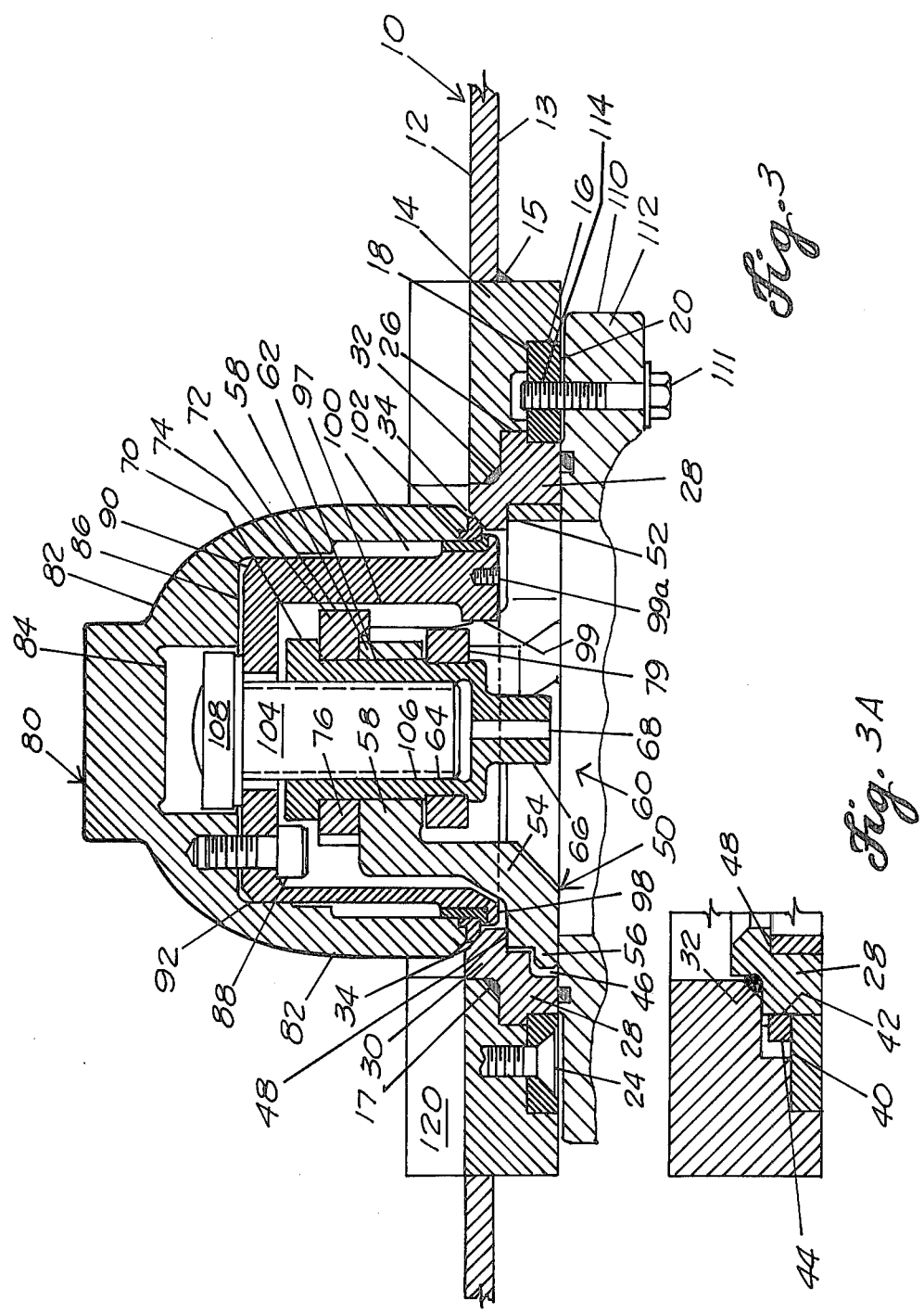
FIG. 3 is an enlarged vertical sectional view of a portion of FIG. 2.
Figure 5:
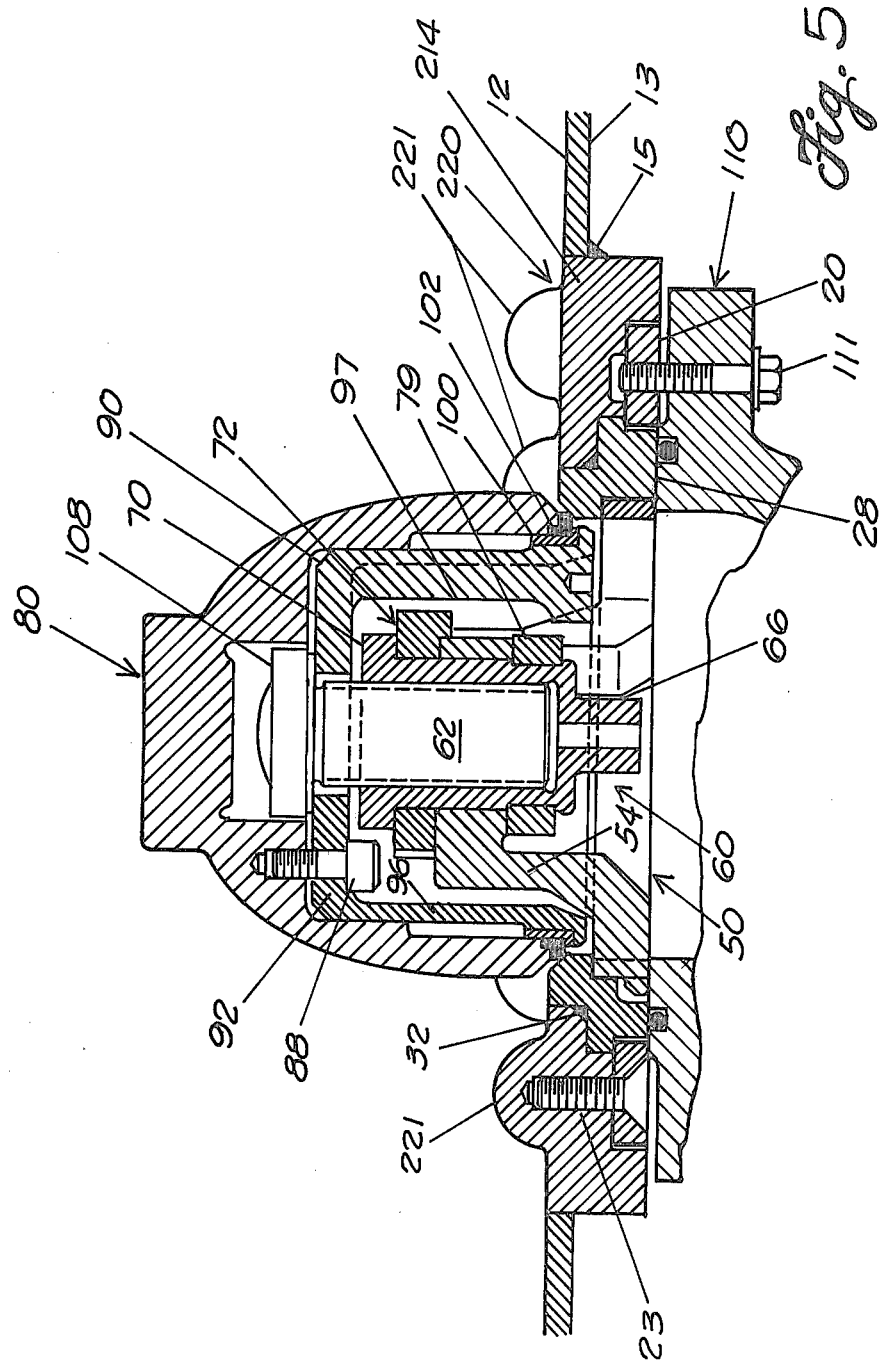
FIG. 5 is a sectional view looking in the direction of the arrows along the line 5—5 in FIG. 4.

This embodiment is disadvantageous because the portions 120 of the mounting flange extending into the car body cause a weight penalty to the car, and a cost penalty because this material is priced on a weight basis. In order to reduce the weight and cost of internal portion 120 of mounting flange 44, the mounting flange embodiment shown in FIGS. 4 and 5 may be utilized. The construction of the other elements shown in FIGS. 4 and 5 may be the same as the construction shown in FIGS. 1-3A. However the mounting flange is modified to the extent that the fastener portion 120 of the mounting flange shown particularly in FIGS. 1-3 is replaced with a mounting flange 214 having a fastener portion 220 including a plurality of mounds or knobs 221 located vertically above the bolt openings 23. The mounds or knobs 221 provide additional material whereby the mounting flange is structurally sound. However the mounds or knobs 221 are only provided in the areas above the fastener openings 23, where such material is required. Thus extensive open portions 222 are also included in this embodiment. Thus with this construction including these large openings 222, the weight of the mounting flange 214 is significantly reduced. Furthermore the cost of this member is reduced because the cost is dependent upon the weight of the member. Furthermore this weight savings result in a significant increase in commodity being transported. The mounting flange construction in FIGS. 4 and 5 is particularly adapted to formation in a casting process.

It should be noted that it is within the scope of the present invention to utilize special material for the mounting flange or for the bolts extending into the mounting flange or through the use of a number of, or different sizes of fasteners, whereby the fastener portion of the mounting flange would not extend above the upper surface of the tank bottom. Thus the invention is not limited to a construction in which the fastener portion extends above the internal surface of the tank except to the extent that the claims may be so limited. However, considering the aspects of corrosion imposed on the inside of tanks by certain commodities, it is advisable to have a minimum thickness, equal to the tank shell thickness, remain above the fastener holes in the mounting flange. If, for example, the tank bottom is 7/16 inch thick and the mounting flange and valve body can extend only one inch below the lower surface of the tank bottom without providing a skid, to comply with current regulations, it is believed that the fastener portion of the mounting flange must extend into the tank above the tank bottom to some degree.

Another embodiment of the present invention is shown in FIG. 6. The construction of all of the elements excepting the mounting flange, the valve body, the keeper assembly, and the retainer plate are the same as illustrated and described hereinabove. This embodiment illustrates that keeper portion 92' can be formed to support seal 102, and thus secondary keeper 100 shown in the previous embodiments, may be eliminated. More significant in this embodiment, the housing 110 is attached directly to the mounting flange 314 with fasteners 312. A plurality of mounds or knobs 318 similar to mounds or knobs 221 in FIGS. 4 and 5 are provided above fasteners 312 to insure that the mounting flange 314 is sufficiently strong in this area.

However instead of utilizing a retainer plate as in FIGS. 1-3, the mounting flange 314 is threaded at 320. Additionally valve body 328 is threaded at 330. One or more openings 332 are provided to receive a tool to apply torque to rotate valve body 328 in threaded engagement with mounting flange 314. As was the case in FIG. 3A, a key 344 is provided in a slot 342 in valve body 328 and in slot 346 in mounting flange 314 to prevent valve body 328 from rotating.

While this embodiment is advantageous in providing a simple threaded fitting instead of the use of retainer plate 20 in FIGS. 1-3, it suffers from the disadvantage that occasionally when mounting flange 314 is welded at 15 into the tank bottom 12, threads 320 will distort during the heating and cooling cycle, which takes place during welding. In this event it becomes difficult to attach valve body 328 because the valve body threads 330 will not align with distorted mounting flange threads 320. Annealing and/or rethreading of threads 320 is thus required.

However to the extent that the weld between the tank bottom 12 and mounting flange 314 can be carried out so as to not distort the threads 320, this is a satisfactory method of attaching the valve body 328 to the mounting flange 314.

What is claimed:

1. A bottom operable tank car lading valve assembly comprising: a tank car mounting flange attached to an opening in the tank bottom; a valve body including a valve seat located radially inwardly from said mounting flange; a valve closure movable between open and closed positions relative to said seat; said mounting flange further including a slot located in the lower internal surface thereof; a retaining ring located within said slot; said retaining ring engaging at least a portion of said valve body to maintain and support the valve body in place within the mounting flange; a depending housing including an unloading opening located below said mounting flange and said retaining ring; said housing held in place with housing fasteners extending into said ring which define a shear plane; said retaining ring held in place within said mounting flange with retainer fasteners extending vertically into said mounting flange; whereby upon hard impact said depending housing will shear off along said housing fasteners and said retainer will remain in place maintaining said valve seat and valve closure in place.

2. A bottom operable tank car lading valve assembly according to claim 1 including a vertically movable closure including a depending seal retainer which holds in place a peripheral seal which engages said valve seat in closed position to maintain lading in the tank; an operator retainer engaging the inner surface of said valve body and including a plurality of radially extending ribs; said retainer ribs engaging an upper valve operator to maintain said upper operator spaced from the walls of the valve body and vertically fixed, but rotatable; said upper operator rotatably engaging a depending stem from the valve closure; said seal retainer including radial portions which upon rotation of said upper operator engages said operator retainer ribs to prevent further rotation of the valve closure, and whereby further rotation of the upper operator causes vertical movement of the valve closure between open and closed positions.

3. A bottom operable tank car lading valve assembly according to claim 2 wherein said seal retainer includes inwardly directed stops which engage stop means on the upper operator when the valve closure reaches the full open position.

4. A bottom operable tank car lading valve assembly according to claim 2 wherein said seal retainer includes spaced first fixture openings in the lower surface thereof, and wherein said seal retainer is held in place with fasteners extending through second fixture openings in said seal retainer and in said closure member, and whereby a first fixture may be attached to said first fixture openings and a second fixture may be attached to said second fixture openings to remove parts for repair or replacement with lading in the tank.

5. A bottom operable tank car lading valve assembly according to claim 1 wherein a mounting flange slot is provided in said mounting flange and a valve body slot is provided in said valve body and wherein a key engages said mounting flange slot and said valve body slot to prevent said valve body from rotating relative to said mounting flange.

6. A bottom operable tank car lading valve assembly according to claim 2 wherein said housing, said operator retainer and said upper operator are all removable with lading in the tank while said valve closure remains seated on said valve seat.

7. A bottom operable tank car lading valve assembly comprising: a tank car mounting flange attached to an opening in the tank bottom; a valve body including a valve seat located radially inwardly from said mounting flange; a valve closure movable between open and closed positions relative to said seat; said mounting flange further including a slot located in the lower internal surface thereof; a retaining ring located within said slot; said retaining ring engaging at least a portion of said valve body to maintain and support the valve body in place within the mounting flange; a depending housing including an unloading opening located below the mounting flange and said retaining ring; said housing held in place with housing fasteners extending into said ring which define a shear plane; said retaining ring held in place within said mounting flange with retainer fasteners extending vertically into said mounting flange; said mounting flange including at least one fastener portion extending into the tank above said retainer fastener openings to provide adequate material to support said valve seat and valve closure with lading in the tank, whereby said mounting flange and valve body need not extend sufficiently far below the tank bottom to require a skid; and whereby upon hard impact said depending housing will shear off along said housing fasteners and said retainer will remain in place maintaining said valve seat and valve closure in place.

8. A bottom operable tank car lading valve assembly according to claim 7 wherein said fastener portion is provided with at least one slot to facilitate lading flow into the outlet during unloading.

9. A bottom operable tank car lading valve assembly comprising: a tank car mounting flange including an internal surface attached to an opening in the tank bottom; a valve body including a valve seat located radially within said mounting flange and engaging said internal surface; a vertically movable valve closure including a depending seal retainer which holds in place a peripheral seal which engages said valve seat in closed position to maintain lading in the tank; an upper operator retainer including a plurality of radially extending ribs having outer ends which engage said valve body; said retainer ribs engaging an upper valve operator to maintain said upper valve operator spaced from the walls of the valve body and vertically fixed, but rotatable; said upper operator engaging a stem depending from said valve closure; upper operator stop means on said upper operator located above said upper operator; said seal retainer including arm portions extending radially inwardly; whereby upon rotation of said upper operator said arm portions engage said retainer ribs to prevent rotation of the valve closure, and whereby rotation of the upper operator causes vertical movement of the valve closure between open and closed positions; said seal retainer including inwardly directed stops which engage said upper operator stop means when the valve closure reaches the full open position.

10. A bottom operable tank car lading valve assembly according to claim 9 wherein said stop member is held in place by said retainer ribs and a shoulder on said upper operator.

* * * * *

UNITED STATES PATENT AND TRADEMARK OFFICE
CERTIFICATE OF CORRECTION

PATENT NO. : 4,198,032

DATED : April 15, 1980

INVENTOR(S) : David P. Hillstead; Robert W. Randolph; Gunter R. Behle

It is certified that error appears in the above-identified patent and that said Letters Patent are hereby corrected as shown below:

Column 3, line 3, "FIG. 6 is an alternative embodiment similar to FIG. 6" should read -- FIG. 6 is an alternative embodiment similar to FIG. 5 --

Signed and Sealed this

Fifth Day of August 1980

[SEAL]

Attest:

SIDNEY A. DIAMOND

Attesting Officer

Commissioner of Patents and Trademarks